(12) United States Patent
Zhang et al.

(10) Patent No.: US 11,212,897 B2
(45) Date of Patent: Dec. 28, 2021

(54) LIGHTING APPARATUS

(71) Applicant: XIAMEN ECO LIGHTING CO. LTD., Xiamen (CN)

(72) Inventors: Yueqiang Zhang, Xiamen (CN); Chunyu Pei, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 71 days.

(21) Appl. No.: 16/847,271

(22) Filed: Apr. 13, 2020

(65) Prior Publication Data
US 2020/0337138 A1 Oct. 22, 2020

(30) Foreign Application Priority Data

Apr. 18, 2019 (CN) .................. 201920532634.X (51) Int. Cl.
| | |
|---|---|
| *H05B 47/115* | (2020.01) |
| *H05B 45/37* | (2020.01) |
| *F21V 29/70* | (2015.01) |
| *H05B 45/3574* | (2020.01) |
| *F21Y 115/10* | (2016.01) |
| *F21Y 103/10* | (2016.01) |

(52) U.S. Cl.
CPC ............ *H05B 47/115* (2020.01); *F21V 29/70* (2015.01); *H05B 45/3574* (2020.01); *H05B 45/37* (2020.01); *F21Y 2103/10* (2016.08); *F21Y 2115/10* (2016.08)

(58) Field of Classification Search
CPC ....... H05B 47/115; H05B 45/37; F21V 29/70; F21Y 2115/01
See application file for complete search history.

(56) References Cited

U.S. PATENT DOCUMENTS

| | | | | |
|---|---|---|---|---|
| 2007/0267984 A1* | 11/2007 | Peng | ................. | H05B 45/3725 315/312 |
| 2012/0133377 A1* | 5/2012 | Shan | ................. | G08B 13/2497 324/713 |
| 2019/0041008 A1* | 2/2019 | Xiong | ................. | H05K 1/00 |
| 2020/0271279 A1* | 8/2020 | Xiong | ................. | F21V 23/023 |

* cited by examiner

*Primary Examiner* — Amy Cohen Johnson
*Assistant Examiner* — Jianzi Chen
(74) *Attorney, Agent, or Firm* — Chun-Ming Shih; HDLS IPR Services (57) ABSTRACT

A lighting apparatus includes a first electrode, a second electrode, a lighting source, a rectifier, a driver and an electric shock prevention circuit. The first electrode and the second electrode receive an external power source. The external power source is either an alternating current or a direct current. The light source has multiple LED modules. The rectifier is used for rectifying the external power source to a rectified power. The driver is used for converting the rectified power to a driving current supplying to the light source.

20 Claims, 7 Drawing Sheets

LIGHTING APPARATUS

FIELD

The present invention is related to a lighting apparatus, and more particularly related to a lighting apparatus with a protection design.

BACKGROUND

Electroluminescence, an optical and electrical phenomenon, was discover in 1907. Electroluminescence refers the process when a material emits light when a passage of an electric field or current occurs. LED stands for light-emitting diode. The very first LED was reported being created in 1927 by a Russian inventor. During decades' development, the first practical LED was found in 1961, and was issued patent by the U.S. patent office in 1962. In the second half of 1962, the first commercial LED product emitting low-intensity infrared light was introduced. The first visible-spectrum LED, which limited to red, was then developed in 1962.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

With high light output, LEDs are available across the visible, infrared wavelengths, and ultraviolet lighting fixtures. Recently, there is a high-output white light LED. And this kind of high-output white light LEDs are suitable for room and outdoor area lighting. Having led to new displays and sensors, LEDs are now be used in advertising, traffic signals, medical devices, camera flashes, lighted wallpaper, aviation lighting, horticultural grow lights, and automotive headlamps. Also, they are used in cellphones to show messages.

A Fluorescent lamp refers to a gas-discharge lamps. The invention of fluorescent lamps, which are also called fluorescent tubes, can be traced back to hundreds of years ago. Being invented by Thomas Edison in 1896, fluorescent lamps used calcium tungstate as the substance to fluoresce then. In 1939, they were firstly introduced to the market as commercial products with variety of types.

In a fluorescent lamp tube, there is a mix of mercury vapor, xenon, argon, and neon, or krypton. A fluorescent coating coats on the inner wall of the lamp. The fluorescent coating is made of blends of rare-earth phosphor and metallic salts. Normally, the electrodes of the lamp comprise coiled tungsten. The electrodes are also coated with strontium, calcium oxides and barium. An internal opaque reflector can be found in some fluorescent lamps. Normally, the shape of the light tubes is straight. Sometimes, the light tubes are made circle for special usages. Also, u-shaped tubes are seen to provide light for more compact areas.

Because there is mercury in fluorescent lamps, it is likely that the mercury contaminates the environment after the lamps are broken. Electromagnetic ballasts in fluorescent lamps are capable of producing buzzing mouse. Radio frequency interference is likely to be made by old fluorescent lamps. The operation of fluorescent lamps requires specific temperature, which is best around room temperature. If the lamps are placed in places with too low or high temperature, the efficacy of the lamps decreases.

In real lighting device design, details are critical no matter how small they appear. For example, to fix two components together conveniently usually brings large technical effect in the field of light device particularly when any such design involves a very large number of products to be sold around the world.

In addition, safety is always an important factor. Lighting devices involves electricity providing, which may cause electric shock to users. Such factor needs to be carefully considered as a necessary aspect on considering and designing new solutions.

SUMMARY

In some embodiments, a lighting apparatus includes a first electrode, a second electrode, a lighting source, a rectifier, a driver and an electric shock prevention circuit.

The first electrode and the second electrode receive an external power source. The external power source is either an alternating current or a direct current.

The light source has multiple LED modules.

The rectifier is used for rectifying the external power source to a rectified power.

The driver is used for converting the rectified power to a driving current supplying to the light source.

In some embodiments, the driver has a PI filter and a direct current converter. The PI filter is connected to the electric shock prevention circuit. The PI filter includes an inductor, a capacitor and two resistors for filtering the rectifier power to a smooth direct current.

The electric shock prevention circuit is disposed between the rectifier and the driver for stopping the rectified power to the driver if a human touch of the first electrode and the second electrode is detected by turning off a check gate. When the external power source is the alternating current, a capacitor connecting to the alternating current is used for turning on the checking gate to supply the rectified power to the driver. When the external power source is the direct current, a diode connecting to the direct current is used for turning on the checking gate to supply the rectified power to the driver.

In some embodiments, the electric shock prevention circuit detects impedance of the first electrode and the second electrode for checking whether there is the human touch.

In some embodiments, the electric shock prevention circuit detects the rectifier power to determine whether the human touch exists.

In some embodiments, the lighting apparatus includes a tubular housing, a first end cap and a second end cap.

The tubular housing is used for enclosing the light source and for allowing a light emitted from the light source passing through the tubular housing. The first end cap and the second end cap are attached to a tube socket and are connected to the first electrode and the second electrode.

In embodiments, the light source is made as a module with a magnet connector for attaching to the tubular housing.

In embodiments, the driver is made as a module attached to the tubular housing via magnet connection.

In some embodiments, there is a safety buckle for further fixing a connection between the light source and the tubular housing.

In some embodiments, there are aligning structures for aligning an electric connection between the light source and the tubular housing.

Different sections of the LED modules are provided with separate heat dissipation bars.

A heat of the heat dissipation bars is lead to a middle portion of the tubular housing.

The direct current is from an urgent battery.

The lighting apparatus also includes a motion sensor connected to the electric shock prevention circuit. When the motion sensor detects a motion from a user, the socket prevention circuit stops sending the rectified power to the driver.

In some embodiments, the electric shock prevention circuit sets a first operation mode and a second operation mode. In the first operation mode, a test current smaller than the rectified power is sent to the driver in the first mode when users just install the lighting apparatus. After a predetermined time period, the electric shock prevention circuit switches the second operation mode for routing all the rectified power to the driver.

A battery is provided for providing the test current to turn on the light source in the first operation mode.

In some embodiments, a lighting apparatus includes a manual switch. Users turn on or turn off the switch when replacing the lighting apparatus. The driver stops providing the driving current when the manual switch is turned off.

In some embodiments, a high temperature indicator for warning users when a temperature of the lighting apparatus is higher than a threshold.

The high temperature indicator is a color changing tape attached on a surface of a light passing cover enclosing the light source.

In some embodiments, a temperature sensor is disposed for detecting the temperature of the lighting apparatus. Users turns on a manual switch and the driver enters a sleep mode and uses the temperature indicator informing the users when the temperature is under a threshold.

In some embodiments, the driver is synchronized with another driver of a neighboring lighting apparatus and turns on the light source under a frequency when the another driver of the neighboring lighting apparatus does not turn on another light source of the neighboring lighting apparatus.

In some embodiments, a light detector is used for performing the synchronization with the neighboring lighting apparatus.

With the designs, the lighting apparatus, no matter it is a light bulb, a light tube or other lighting devices, is safer while maintaining low cost on manufacturing.

DETAILED DESCRIPTION

Figure 3:
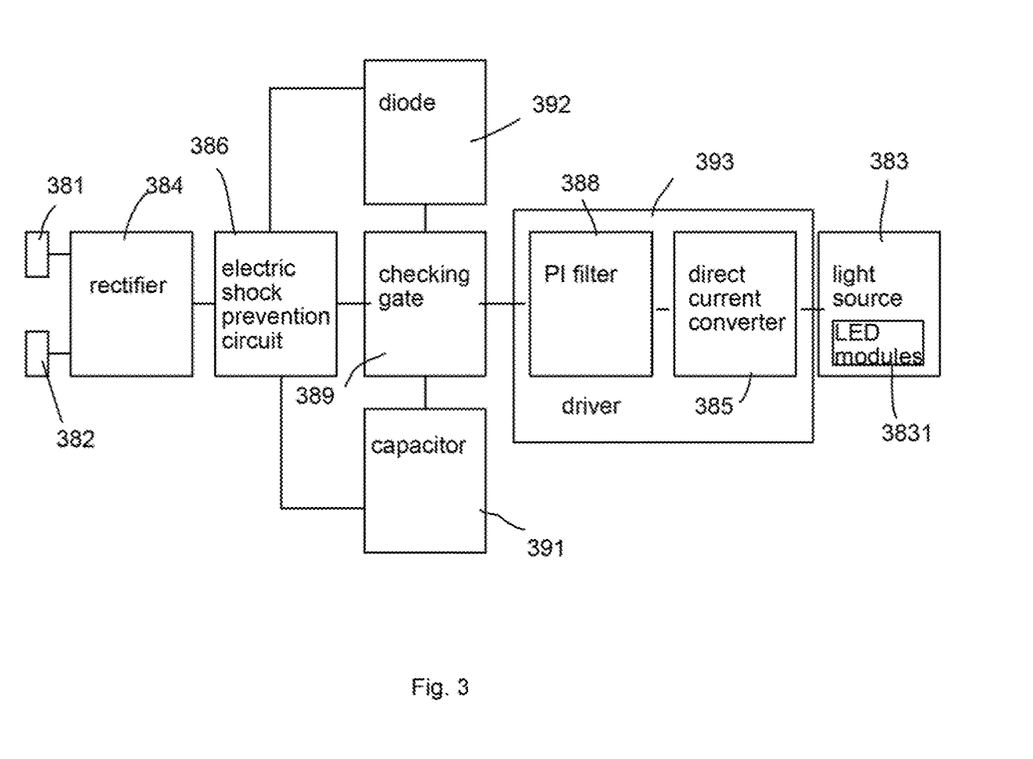
FIG. 3 shows another architecture diagram of an embodiment.

In FIG. 3, a lighting apparatus includes a first electrode 381, a second electrode 382, a lighting source 383, a rectifier 384, a driver 385 and an electric shock prevention circuit 386.

The first electrode 381 and the second electrode 382 receives an external power source. The external power source is either an alternating current or a direct current.

The light source 383 has multiple LED modules 3831.

The rectifier 384 is used for rectifying the external power source to a rectified power.

The driver 385 is used for converting the rectified power to a driving current supplying to the light source 383.

The electric shock prevention circuit 386 is disposed between the rectifier 384 and the driver 385 for stopping the rectified power to the driver 385 if a human touch of the first electrode 381 and the second electrode 382 is detected by turning off a checking gate 389. When the external power source is the alternating current, a capacitor 391 connecting to the alternating current is used for turning on the checking gate 389 to supply the rectified power to the driver 385. When the external power source is the direct current, a diode 392 connecting to the direct current is used for turning on the checking gate 389 to supply the rectified power to the driver 385.

In FIG. 3, the driver 385 has a PI filter 388 and a direct current converter 393. The PI filter 388 is connected to the electric shock prevention circuit 386. The PI filter 388 includes an inductor, a capacitor and two resistors for filtering the rectifier power to a smooth direct current.

In some embodiments, the electric shock prevention circuit detects impedance of the first electrode and the second electrode for checking whether there is the human touch.

In some embodiments, the electric shock prevention circuit detects the rectifier power to determine whether the human touch exists.

Figure 4:
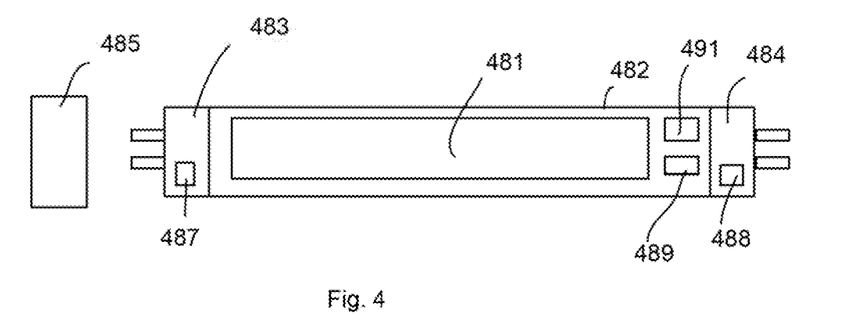
FIG. 4 shows a light tube example.

In FIG. 4, the lighting apparatus includes a tubular housing 482, a first end cap 483 and a second end cap 484.

The tubular housing 482 is used for enclosing the light source 481 and for allowing a light emitted from the light source 481 passing through the tubular housing 482. The first end cap 483 and the second end cap 484 are attached to a tube socket 485 and are connected to the first electrode and the second electrode.

Figure 5:
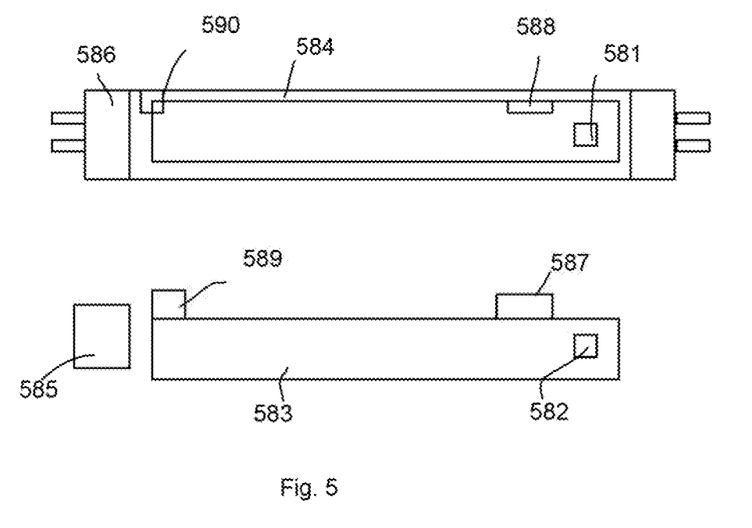
FIG. 5 shows another light tube example.

In FIG. 5 the light source 583 is made as a module with a magnet connector 582 for attaching to a magnet unit 581 of the tubular housing 584.

In FIG. 5, the driver 585 is made as a module attached to the tubular housing 584 via magnet connection.

In FIG. 5, there is a safety buckle 587 connected to a socket 588 for further fixing a connection between the light source 583 and the tubular housing 584.

In FIG. 5, there are aligning structures 589, 590 for aligning an electric connection between the light source 583 and the tubular housing 584.

Figure 6:
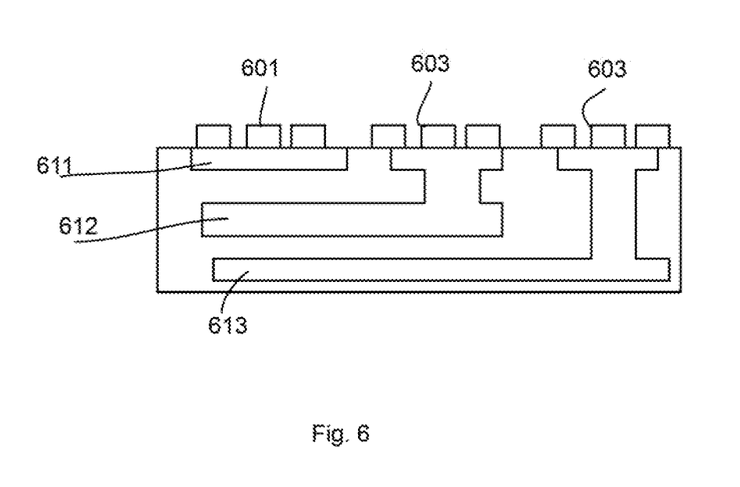
FIG. 6 shows a heat dissipation structure.

In FIG. 6, different sections 601, 602, 603 of the LED modules are provided with separate heat dissipation bars 611, 612, 613.

In some embodiments, heat of the heat dissipation bars is lead to a middle portion of the tubular housing.

In some embodiments, the direct current is from an urgent battery.

In FIG. 4, the lighting apparatus also includes a motion sensor 487 connected to the electric shock prevention circuit. When the motion sensor 487 detects a motion from a user, the socket prevention circuit stops sending the rectified power to the driver.

In some embodiments, the electric shock prevention circuit sets a first operation mode and a second operation mode. In the first operation mode, a test current smaller than the rectified power is sent to the driver in the first mode when users just install the lighting apparatus. After a predetermined time period, the electric shock prevention circuit switches the second operation mode for routing all the rectified power to the driver.

In some embodiments, a battery is provided for providing the test current to turn on the light source in the first operation mode.

In FIG. 4, a lighting apparatus includes a manual switch 488. Users turn on or turn off the manual switch 488 when replacing the lighting apparatus. The driver stops providing the driving current when the manual switch 488 is turned off.

In FIG. 4, a high temperature indicator 489 for warning users when a temperature of the lighting apparatus is higher than a threshold.

In some embodiments, the high temperature indicator is a color changing tape attached on a surface of a light passing cover enclosing the light source.

In FIG. 4, a temperature sensor 491 is disposed for detecting the temperature of the lighting apparatus. Users turns on the manual switch 488 and the driver enters a sleep mode and uses the temperature indicator 489 informing the users when the temperature is under a threshold.

Figure 7:
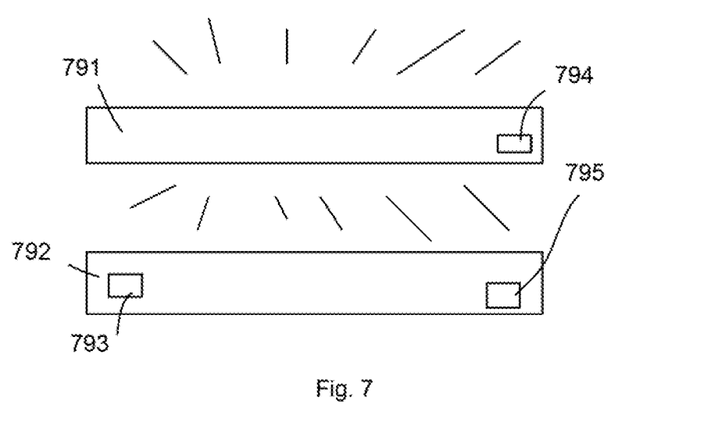
FIG. 7 shows an anti-flicking embodiment.

In FIG. 7, the driver 795 of a light tube device 793 is synchronized with another driver 794 of a neighboring lighting apparatus 791 and turns on the light source under a frequency when the another driver 794 of the neighboring light tube device 791 does not turn on another light source of the neighboring light tube device 791.

In FIG. 7, a light detector 793 is used for performing the synchronization with the neighboring light tube device 791.

Figure 1:
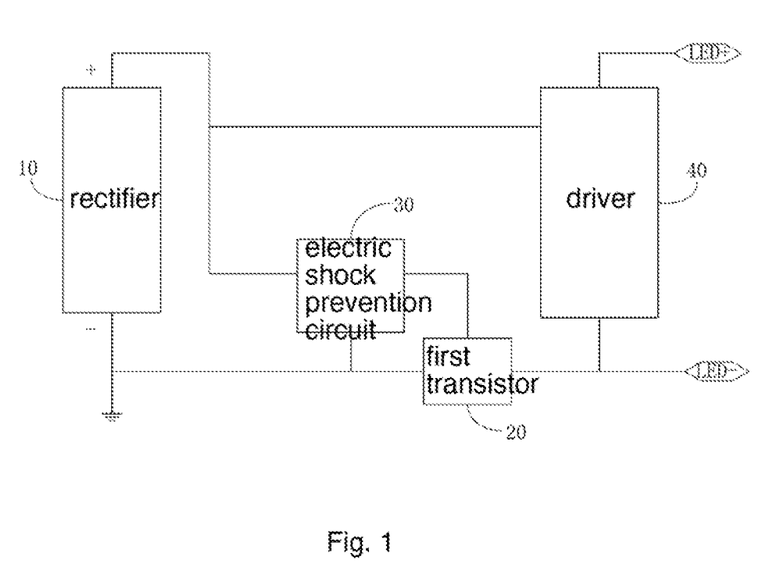
FIG. 1 is an architecture diagram of an embodiment.

Please refer to FIG. 1, which illustrates a circuit diagram of an embodiment of a lighting apparatus.

There are single end LED light tubes and double ended LED light tubes. For the later type of LED light tubes, it is possible when people install or remove the LED light tubes, they get electricity shocked. Therefore, an electric shock prevention module is used for detecting whether there is a human touch for the electrodes, e.g. impedance parameters, which may cause electric shock and for stopping electricity to get into the human.

When the human touch is found, there is a high impedance in the electric shock prevention circuit for making the lighting apparatus in an open mode, i.e. no electricity is further supplied the lighting apparatus to prevent human getting electricity shocked. However, when there are both alternating current power input and direct current power input, the electric shock prevention circuit may fail to function on both modes. For example, the electric shock prevention circuit may function under an alternating current but fails to respond under a direct current, e.g. from an urgent battery. This technical problem needs to solved to provide a safer lighting apparatus.

In FIG. 1, a power circuit includes a rectifier 10, a first transistor 20, an electric shock prevention circuit 30 and a driver 40.

A first input end of the rectifier 10 is used as a positive input of the power circuit. The second input end of the rectifier 10 is used as a negative input of the power circuit. The rectifier 10 supplies a first voltage signal on a positive input end and is connected to ground in the negative output end.

The first transistor 20 is connected between the negative output and ground of the power circuit.

An input end of the electric prevention circuit 30 is connected to a positive output end of the rectifier 10. An output end of the electric shock prevention circuit 30 is connected to a control end of the first transistor 20.

The electric shock prevention circuit 10 is used for opening or closing the circuit by controlling turning-on or turning-off of the first transistor 20 for prevention human getting electric shocked.

The input end of the driver 40 is connected to the positive output end of the rectifier 10. The positive output end of the driver 40 is connected to the positive output end of the power circuit. The driver 40 provides power to the LED+ and LED− ends of a light source.

The rectifier may be a full bridge rectifier for converting a sine curve input of 50 Hz or 60 Hz alternating current to a half wave 100 Hz or 12 Hz voltage signal.

Figure 2:
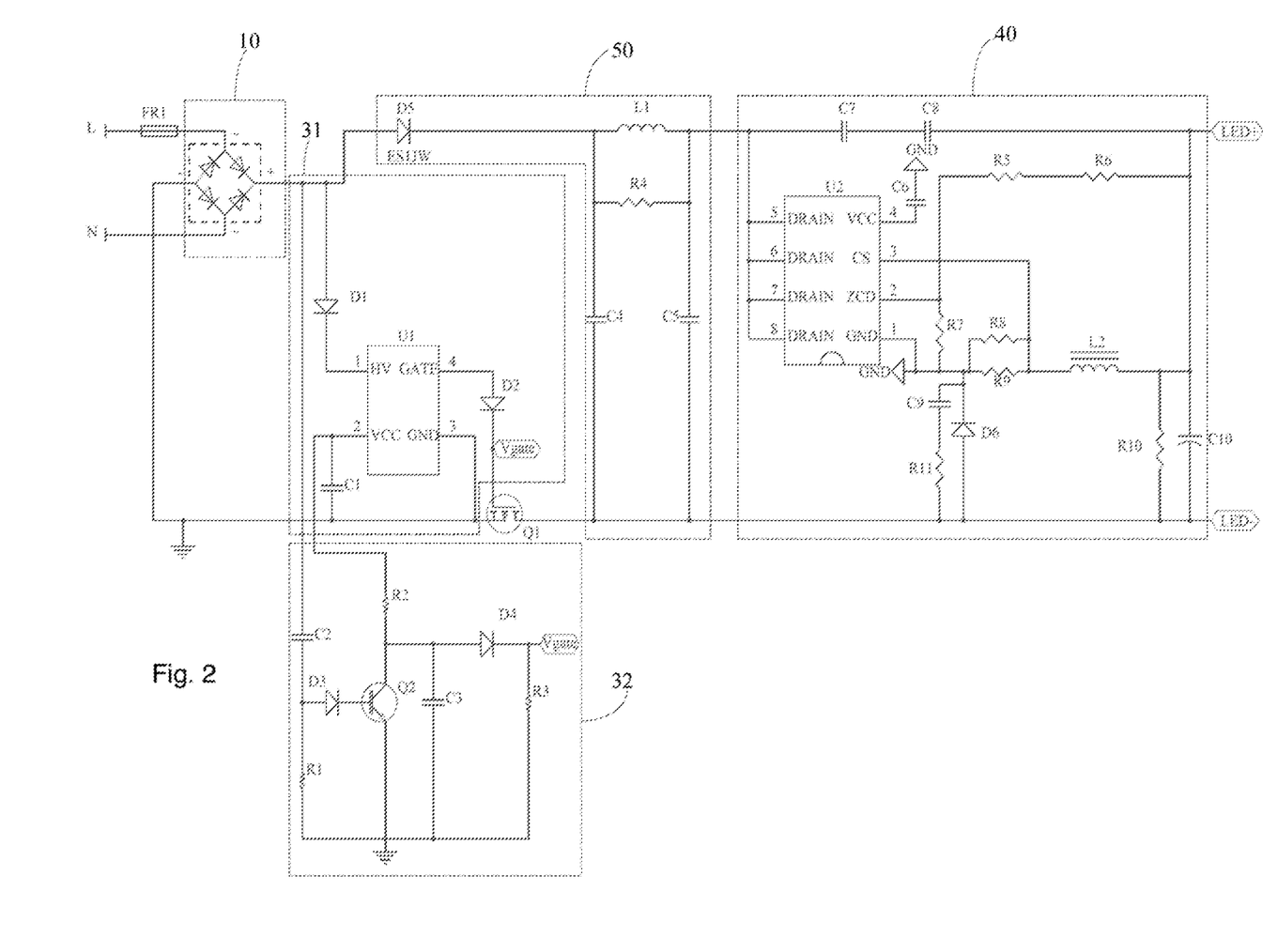
FIG. 2 is a circuit diagram showing an example.

In FIG. 2, an example circuit diagram is provided.

The electric prevention circuit includes a driver module 31 and a direct current driver module 32. The alternating driver module 31 has an input end connected to a positive output end of a rectifier 10. The voltage output end of the alternating driver module 31 provides a second voltage signal. The alternating driver module 31 has a driver end connected to a control end of the first transistor. The alternating driver module 31 is used for controlling the first transistor 20 to open for preventing electric shock when the power signal is an alternating current signal.

The input end of the direct current driver module 32 is connected to a positive output end of the rectifier 10. The direct current driver module 32 has a direct current input end connected to a voltage output end of the electric shock prevention circuit 30.

The output end of the direct current driver module 32 is connected to the control end of the first transistor 20. The direct current driver module 32 controls the first transistor 20 to open for preventing electric shock when the input power is direct current.

With the alternating driver module 31 and the direct current driver module 32, the power circuit works normally in both alternating current mode and direct current mode.

The operation is explained as follows.

When the power signal is an alternating current signal, a half wave direct current signal output by the rectifier 10 is sent to the electric shock prevention module. When the alternating driver module 31 receives the half wave direct current signal, the driver end of the alternating driver module 31 outputs a high voltage control signal to the control end of the first transistor 20 to provide an turning-on voltage to the first transistor for closing the power circuit to work normally providing power to the LED modules.

When an impedance is detected in the electric network, the electric shock prevention circuit shows a high impedance status, and the driver end of the alternating driver module 31 no more outputs a high voltage signal and thus turns off the first transistor 20 so that the power circuit is open to prevent electric shock.

When the input power source is a direct current signal, the voltage output end of the electric shock prevention circuit outputs a direct voltage signal to the direct current input end of the direct current driver module 32, then passing through the direct current driver module 32 and outputs a high voltage to the control end of the first transistor 20 to turn on the first transistor 20 so that the power circuit is closed and work normally providing the LED modules to emit light.

By using such designs, the lighting apparatus is able to function normally in both direct current mode and alternating current mode. The first transistor works correctly in both modes, making the lighting apparatus safer.

In FIG. 2, the alternating driver module 31 includes an electric shock prevention chip U1, a first diode D1, a second diode D2 and a capacitor C1.

The positive end of the first diode D1 is used as an input end of the alternating driver module 31. The negative end of the first diode D1 is connected to HV end (High voltage enabling end) of the electric shock prevention chip U1 for providing a starting voltage for the electric shock prevention chip U1 when the rectifier 10 receives a direct current or an alternating current power signal.

The positive end of the second diode D2 is connected to the GATE end of the electric shock prevention chip U1. the negative end of the second diode D2 is used as a driver end of the alternating driver module 31. The first end of the first capacitor C1 is connected to a power output end and a second end of the first capacitor is connected to ground.

In FIG. 2, the direct current driver module 32 includes a second capacitor C2, a third capacitor C3, a first resistor R1, a second resistor R2, a third resistor R3, a third diode D3, a fourth diode D4 and a second transistor Q2.

A first end of the second capacitor C2 is used as an input end of the direct current driver module 32. A second end of the second capacitor C2 is connected to a positive end of the third diode D3 and the first end of the first resistor R1. The third diode D3 has a negative end connected to the control end of the second transistor Q2.

The first end of the second resistor R2 is used as a direct current input end of the direct current driver module 32. The second end of the second resistor R2 is connected to the input end of the second transistor Q2, the first end of the third capacitor C3, and the positive end of the fourth diode D4. the negative end of the fourth diode D4 is connected to a first end of the third resistor R3.

The negative end of the fourth diode D4 is used as a direct current output end of the direct current driver module 32. The second end of the first resistor R1, the output end of the second transistor Q2, the second end of the third capacitor C3 and the second end of the third resistor are connected to ground.

When the power circuit is supplied with a power signal of a direct current or an alternating current, the electric shock prevention chip U1 determines whether the power signal is a direct current signal or an alternating current signal. This is understood by persons skilled in the art and not repeated the details for brevity.

When the power signal is a direct current signal, the high voltage activation end HV of the electric shock prevention chip U1 provides voltage output to a voltage output end VCC. The high voltage activation end HV is not connected to the ground GND so that the gate control end GATE does not output control signals. The circuit of the second resistor R2 and the fourth diode D4 form a path providing a turning-on voltage to the first transistor Q1 to close the power circuit to work normally.

When the power signal is an alternating signal, the high voltage activation end HV provides a voltage to the voltage output end VCC so that the voltage output end VCC outputting a second voltage signal. The high voltage activation end HV and the ground GND are connected so that the gate control end of the electric shock prevention chip U1 is able to output a control signal for charging the first capacitor C1 with the half wave direct current signal so as to provide a turning-on voltage to the second transistor Q2. When the second transistor Q2 is turned on, the positive end of the fourth diode D4 switches to a low voltage, and disconnect the fourth diode D4 to separate the second voltage signal output by the electric shock prevention chip U1 from the voltage output end and the control signal of the gate control end GATE of the electric shock prevention chip U1.

By sending a control signal from the gate control end GATE of the electric shock prevention chip U1 to the control end of the first transistor Q1 to turn on the first transistor Q1 so that the power circuit is closed and works normally.

The first transistor Q1 and the second transistor Q2 may be MOS transistor or other quick response control switch. The electric shock prevention chip may be a BP5018J chip or compatible circuit.

In FIG. 2, the power circuit also includes a filter circuit 50. The filter circuit 50 has a positive end connected to a positive input end of the rectifier circuit 10. The positive output end of the filter circuit 50 is connected to a positive end of the driver 40. The negative output end of the filter circuit is connected to a negative output end LED− of the power circuit.

In FIG. 2, the filter circuit 50 is a PI filter for satisfying EMC requirements.

The filter circuit 50 includes a fifth diode D5, a first inductor L1, a fourth resistor R4, a fourth capacitor C4 and a fifth capacitor C5.

The positive end of the fifth diode D5 is used as a positive input end of the filter circuit 50. The negative end of the fifth diode D5 is connected to a first end of the first inductor L1, the first end of the fourth resistor R4, the first end of the fourth capacitor C4.

The positive input end of the driver 50 is connected to a second end of the first inductor L1, a second end of the fourth resistor R4, a first end of the fifth capacitor C5.

The second end of the first inductor L1 is used as the positive output end of the filter circuit 50. The second end of the fourth resistor R4 is connected to the first end of the fifth capacitor C5 and the second end of the first inductor L1. The second end of the fourth capacitor C4 is connected to the second end of the fifth capacitor C5, and the negative output end of the power circuit. The fifth diode D5 may be a tap style or a quick recovery diode.

In FIG. 2, the driver circuit 40 includes a driver chip U2, a sixth capacitor C6, a seventh capacitor C7, a eighth capacitor C8, a ninth capacitor C9, a tenth capacitor C10, a fifth resistor R5, a sixth resistor R6, a seventh resistor R7, an eighth resistor R8, a ninth resistor R9, a tenth resistor R10, an eleventh resistor R1, a sixth diode D6 and a second inductor L2.

The fifth pin 5, the sixth pin 6, the seventh pin 7, the eighth pin 8 of the driver chip U2 are connected to the second end of the first inductor L1.

The second end of the first inductor L1 is connected to a first end of the seventh capacitor C7. the second end of the seventh capacitor C7 is connected to a first end of the eighth capacitor C8. The second end of the eighth capacitor C8 is connected to a positive output end LED+, and the first end of the tenth capacitor C10.

The first end of the sixth capacitor C6 is connected to a power management end VCC of the driver chip U2. The second end of the sixth capacitor C6 is connected to ground.

The resistor sensing end CS of the driver chip US is connected to the first end of the eighth resistor R8, the first end of the ninth resistor R9 and a first end of the second inductor L2. the second end of the ninth resistor R9 and the second end of the eighth resistor R8 are connected to ground.

The ZCD end of the driver chip U2 is connected to the first end of the seventh resistor R7 and the first end of the fifth resistor R5.

The second end of the seventh resistor R7 is connected to ground. The second end of the fifth resistor R5 is connected to a first end of the sixth resistor R6.

The second end of the sixth resistor R6 is connected to a second end of the eighth capacitor C8, the positive output end LED+, and the first end of the tenth capacitor C10.

The first end of the ninth capacitor C9 is connected to ground. The positive end of the sixth diode D6 is connected to a first end of the eleventh resistor R11, the first end of the tenth resistor R10, the second end of the tenth capacitor C10, the input end of the first transistor Q1 and the negative end LED− of the power circuit.

The negative end of the sixth diode D6 is connected to ground. The second end of the eleventh resistor R11 is connected to a second end of the ninth capacitor C9.

The second end of the tenth resistor R10 is connected to the second end of the second inductor L2, the positive output end LED+ of the power circuit, the first end of the tenth capacitor C10.

In some other embodiments, the driver circuit may be a switch power circuit of separation form or non-separation form.

In FIG. 2, when the power signal source is an alternating current, there is a relay FR1 in the input end of the rectifier.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
a first electrode;
a second electrode, the first electrode and the second electrode receiving an external power source, the external power source being either an alternating current or a direct current;
a light source having multiple LED modules;
a rectifier for rectifying the external power source to a rectified power;
a driver for converting the rectified power to a driving current supplying to the light source; and
an electric shock prevention circuit disposed between the rectifier and the driver for stopping the rectified power to the driver if a human touch of the first electrode and the second electrode is detected by turning off a checking gate, wherein when the external power source is the alternating current, a capacitor connecting to the alternating current is used for turning on the checking gate to supply the rectified power to the driver, when the external power source is the direct current, a diode connecting to the direct current is used for turning on the checking gate to supply the rectified power to the driver.

2. The lighting apparatus of claim 1, wherein the driver has a PI filter and a direct current converter, the PI filter is connected to the electric shock prevention circuit, the PI filter comprises an inductor, a capacitor and two resistors for filtering the rectifier power to a smooth direct current.

3. The lighting apparatus of claim 1, wherein the electric shock prevention circuit detects impedance of the first electrode and the second electrode for checking whether there is the human touch.

4. The lighting apparatus of claim 1, wherein the electric shock prevention circuit detects the rectifier power to determine whether the human touch exists.

5. The lighting apparatus of claim 1, further comprising a tubular housing, a first end cap and a second end cap, wherein the tubular housing is used for enclosing the light source and for allowing a light emitted from the light source passing through the tubular housing, the first end cap and the second end cap are attached to a tube socket and are connected to the first electrode and the second electrode.

6. The lighting apparatus of claim 5, wherein the light source is made as a module with a magnet connector for attaching to the tubular housing.

7. The lighting apparatus of claim 6, wherein the driver is made as a module attached to the tubular housing via magnet connection.

8. The lighting apparatus of claim 6, wherein there is a safety buckle for further fixing a connection between the light source and the tubular housing.

9. The lighting apparatus of claim 5, wherein different sections of the LED modules are provided with separate heat dissipation bars.

10. The lighting apparatus of claim 9, wherein a heat of the heat dissipation bars is lead to a middle portion of the tubular housing.

11. The lighting apparatus of claim 1, wherein the direct current is from an urgent battery.

12. The lighting apparatus of claim 1, further comprising a motion sensor connected to the electric shock prevention circuit, when the motion sensor detects a motion from a user, the socket prevention circuit stops sending the rectified power to the driver.

13. The lighting apparatus of claim 1, wherein the electric shock prevention circuit sets a first operation mode and a second operation mode, in the first operation mode, a test current smaller than the rectified power is sent to the driver in the first mode when users just install the lighting apparatus, and after a predetermined time period, the electric shock prevention circuit switches the second operation mode for routing all the rectified power to the driver.

14. The lighting apparatus of claim 13, wherein a battery is provided for providing the test current to turn on the light source in the first operation mode.

15. The lighting apparatus of claim 1, further comprising a manual switch, users turn on or turn off the manual switch when replacing the lighting apparatus, the driver stops providing the driving current when the manual switch is turned off.

16. The lighting apparatus of claim 15, further comprising a high temperature indicator for warning users when a temperature of the lighting apparatus is higher than a threshold.

17. The lighting apparatus of claim 16, wherein the high temperature indicator is a color changing tape attached on a surface of a light passing cover enclosing the light source.

18. The lighting apparatus of claim 16, wherein a temperature sensor is disposed for detecting the temperature of the lighting apparatus, users turn on a manual switch and the driver enters a sleep mode and uses the temperature indicator informing the users when the temperature is under a threshold.

19. The lighting apparatus of claim 1, wherein the driver is synchronized with another driver of a neighboring lighting apparatus and turns on the light source under a frequency when the another driver of the neighboring lighting apparatus does not turn on another light source of the neighboring lighting apparatus.

20. The lighting apparatus of claim 19, wherein a light detector is used for performing the synchronization with the neighboring lighting apparatus.

\* \* \* \* \*